United States Patent [19]

Weber

[11] Patent Number: 4,670,327
[45] Date of Patent: Jun. 2, 1987

[54] HEAT RESISTANT AND PROTECTIVE FABRIC AND YARN FOR MAKING THE SAME

[76] Inventor: John W. Weber, c/o Amatex Corp., 1032 Stanbridge St., Norristown, Pa. 18404

[21] Appl. No.: 211,815

[22] Filed: Dec. 1, 1980

[51] Int. Cl.[4] ............................ D02G 3/18; D02G 3/44
[52] U.S. Cl. ........................................ 428/257; 57/229; 428/263; 428/373; 428/377; 428/392; 428/394; 428/902; 428/920
[58] Field of Search ............... 428/257, 263, 373, 377, 428/392, 394, 902, 920; 57/229

[56] References Cited

U.S. PATENT DOCUMENTS

| | | | |
|---|---|---|---|
| 2,179,087 | 11/1939 | Gibbons . | |
| 2,230,271 | 2/1941 | Simpson . | |
| 3,292,991 | 12/1966 | Crawley | 428/902 |
| 3,395,527 | 8/1968 | Longley . | |
| 3,751,897 | 8/1973 | Bailey . | |
| 3,811,262 | 5/1974 | Clarkson . | |
| 4,255,817 | 3/1981 | Heim | 428/920 |
| 4,381,639 | 5/1983 | Kress | 57/229 |

Primary Examiner—Marion C. McCamish
Attorney, Agent, or Firm—Benasutti and Murray

[57] ABSTRACT

A heat resistant fabric is provided, preferably woven, and with an optional aluminized backing, the fabric being made from yarns having a core of flame and high heat resistant silica fibers covered by a layer of aramid fiber, or other heat resisting fibers, with or without blending with other fibers, the covering layer providing a cushion to increase abrasion resistance of the core while also providing a heat resistant covering for the core.

8 Claims, 2 Drawing Figures

HEAT RESISTANT AND PROTECTIVE FABRIC AND YARN FOR MAKING THE SAME

BACKGROUND OF THE INVENTION

1. Field of the Invention P This invention relates to heat resistant fabrics and yarn for making the same.

2. Brief Description of the Prior Art

It has heretofore been common practice to make heat resistant fabrics from yarns of asbestos fibers. Examples of asbestos yarns are shown in the U.S. Pat. Nos. to Gibbons, 2,179,087; Simpson, 2,230,271; Longley, 2,395,527; Bailey, 3,751,897; and Clarkson, 3,811,262.

More recently the use of asbestos fibers for yarns and for other purposes has been considered hazardous to the user as well as other persons exposed to the fibers.

The fabric and yarn of the present invention do not employ asbestos nor other materials considered hazardous.

SUMMARY OF THE INVENTION

In accordance with the invention a fabric is provided suitable for protective garments and clothing, and for protection of equipment against elevated heat exposure, is resistant to thermal shock attendant upon splashing of molten metals, and which is made from yarns having high temperature resistance with a central core of low abrasion resistant material wrapped with a covering also resistant to high temperatures but being abrasion resistant and which protects the core, thereby providing a yarn suitable for use for protective fabrics. The core is preferably of silica fibers, available under the name Refrasil from Hitco Materials Division, Subsidiary of Armco Inc., Gardena, Calif. and also under the name of Nextel from the 3M Company, St. Paul, Minn. The wrapping is preferably of heat resisting fibers such as aramid fibers, polybenzimidazole fibers, phenolic fibers or a blend of any of such fibers. Aramid fibers are made by the DuPont Co. and are known as Kevlar and Nomex. Polybenzimidazole fibers are made by the Celanese Co. of Chatham, N.J. and are known as P.B.I. fibers, phenolic fibers are made by the Nippon Kynol Corp. of Japan and available in the U.S.A. from American Kynol, Inc., Altamonte Springs, Fla.. A protective lamination adherent to the fabric, and which may be aluminum foil, may be employed to increase the heat reflectivity and effectiveness of the fabric.

It is the principal object of the invention to provide a fabric for protecting personnel and equipment, which fabric is resistant to high temperatures, thermal shock and abrasion and which is light in weight and effective in use.

It is a further object of the invention to provide a yarn for making a protective fabric as aforesaid.

It is a further object of the invention to provide a composite yarn for the making of protective temperature and thermal shock resistant fabrics in which the core of the yarn is covered and protected so that the combined qualities of the core and the cover are made available.

Other objects and advantageous features of the invention will be apparent from the description and claims.

BRIEF DESCRIPTION OF THE DRAWINGS

The nature and characteristic features of the invention w be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
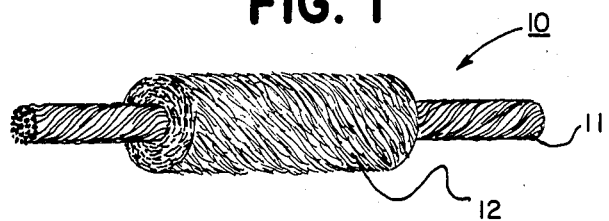
FIG. 1 is an enlarged view in elevation of a yarn in accordance with the invention.

Referring now more particularly to FIG. 1 of the drawings a yarn 10 is there illustrated which includes a core 11 and a cover 12 enclosing the core 11.

The core 11 is preferably of silica fibers, available under the name Refrasil, from Hitco Material Division, Subsidiary of Armco Inc., Gardena, Calif.

The core 11 is of fragile material with low abrasion resistance, although having a high temperature resistance of the order of 2000° F. and a thermal shock resistance to molten steel of the order of 2850° F.

The size and weight of the core 11 may be varied as desired, one suitable core being Tex #150 or 1350 denier. The core 11 as shown in FIG. 1, is a continuous filament and may have a twist of the order of four turns per inch.

The covering 12 is preferably of aramid fibers, each fiber being individually wrapped around the core 11, one suitable material being available under the tradename Kevlar from E. I. du Pont de Nemours & Company. The covering 12 can also be of a blend of aramids, or of an aramid blended with other fibers. One suitable blend may consist of Kevlar, Nomex and Kynol of varying percentages of each. Nomex is the tradename of an aramid fiber available from E. I. du Pont de Nemours & Company. Kynol is the tradename of phenolic fibers available from Nippon Kynol Corporation of Japan, and available in the United States of America from American Kynol, Inc., of Altemonte Springs, Fla.

Other heat resisting fibers, such as polybenzimidazole, known as P.B.I. fibers available from Celanese Corporation, of Chatham, N.J., or phenolic fibers, such as Kynol, may each be blended with the other heat resisting fibers.

The size and weight of the covering 12 may be varied as desired but one suitable covering is Tex #65 or 585 denier. The covering 12 can be applied to the core 11 by wrapping the fibers around core 11 so that it is completely covered.

The coverings 12, referred to above, are not as temperature resistant as the core 11 but provide a cushion around the core 11 so that its fragility and lack of abrasion resistance are largely overcome. A suitable yarn is thus provided capable of being fabricated into a textile fabric which is resistant to high temperatures and to thermal shock.

Figure 2:
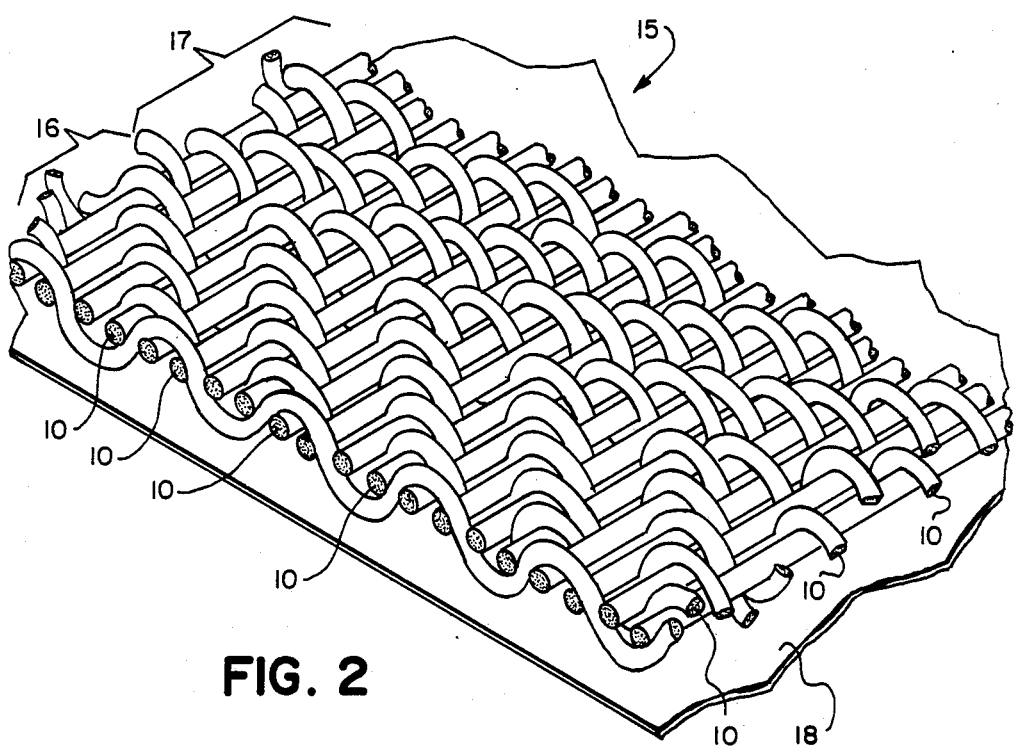
FIG. 2 is an enlarged view in perspective of a suitable fabric made from the yarn of FIG. 1.

Referring now to FIG. 2 one suitable textile fabric 15 is there illustrated. The textile fabric 15 is shown as a herringbone weave with warp threads and filling threads both of the yarn 10 heretofore described. Warp threads and filling threads may be of single or plyed construction. The weave may be of any desired pattern to provide a stable textile fabric but as illustrated comprises unitary bands 16 and 17 of two up, two down twill and each of a width of approximately one half inch. The weight of the textile fabric may be varied as desired but fabrics weighing 16 oz., 18 oz. and 26 oz. per square yard with one core side, have been found suitable for a variety of purposes including protection of personnel and equipment. The textile fabric 15 can be made into protective clothing and maintenance fabrics. The textile fabric 15 has high heat and abrasive resistance, and resistance to thermal shock attendant upon splashing of molten metal.

As also shown in FIG. 2 a backing or lamination 18 can be provided, preferably of aluminum foil by vacuum application, by passing the fabric and the foil between pressure applying rolls after an adhesive has been applied to the fabric, or in any other desired manner, to increase heat reflectivity and further enhance the qualities of the fabric.

I claim:

1. A yarn comprising a sheath of individually wrapped aramid fibers surrounding and substantially covering a continuous filament core of amorphous silica product containing at least 96% silica and having the thermal performance of a refractory material.

2. A composite yarn comprising a wrapping of individual fibers which are wrapped about a continuous filament core of an amorphous silica product containing at least 96% silica and having the thermal performance of a refractory material.

3. The yarn of claim 2 wherein said wrapping is less heat resistant than said core.

4. The yarn of claim 3 wherein said wrapping is comprised of fibers selected from the group consisting essentially of aramid fibers, polybenzimidazole fibers and phenolic fibers.

5. The yard of claim 2 wherein said core has a twist on the order of four turns per inch.

6. A protective garmet comprised of a high temperature fabric produced by interweaving composite yarns, each composite yarn comprising a continuous core filament of amorphous silica product containing approximately 95% silica and having the thermal performance of a refractory material and a wrapping encasing said continuous core filament, said wrapping being further comprised of individually wrapped fibers selected from the group consisting essentially of aramid fibers, polybenzimidazole fibers and phenolic fibers.

7. A woven high temperature resistant textile fabric having interwoven yarns comprised of a core yarn and a wrapping of individual fibers wherein the core yarn is an amorphous silica product containing at least 96% silica and having the thermal performance of a refractory material and the wrapping is less temperature resistant than the core yarn and is selected from a group consisting of aramid fibers, polybenzimidazole fibers, phenolic fibers or of a blend of fibers from the group.

8. The woven textile fabric according to claim 7, characterized in that the same is a herringbone weave.

* * * * *

UNITED STATES PATENT AND TRADEMARK OFFICE
CERTIFICATE OF CORRECTION

PATENT NO. : 4,670,327
DATED : June 2, 1987
INVENTOR(S) : John W. Weber

It is certified that error appears in the above-identified patent and that said Letters Patent is hereby corrected as shown below:

In the specification:

At column 1, line 6 delete the "P" after the word invention.

At column 1, line 67, "w be" should read --will be--.

In the claims:

In claim 6, line 13, "95%" should read --96%.--

Signed and Sealed this

Third Day of November, 1987

Attest:

DONALD J. QUIGG

*Attesting Officer*　　　　　*Commissioner of Patents and Trademarks*